(12) United States Patent
Guo

(10) Patent No.: US 11,295,144 B2
(45) Date of Patent: Apr. 5, 2022

(54) OBSTACLE CLASSIFICATION METHOD AND APPARATUS BASED ON UNMANNED VEHICLE, DEVICE, AND STORAGE MEDIUM

(71) Applicant: Baidu Online Network Technology (Beijing) Co., Ltd., Haidian District Beijing (CN)

(72) Inventor: Jiang Guo, Haidian District Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 282 days.

(21) Appl. No.: 16/515,985

(22) Filed: Jul. 18, 2019

(65) Prior Publication Data

US 2020/0065592 A1 Feb. 27, 2020

(30) Foreign Application Priority Data

Sep. 7, 2018 (CN) .......................... 201811044529.8

(51) Int. Cl.
*G06K 9/00* (2006.01)
*G06F 16/22* (2019.01)
(Continued)

(52) U.S. Cl.
CPC ..... *G06K 9/00805* (2013.01); *G06F 16/2246* (2019.01); *G06K 9/628* (2013.01);
(Continued)

(58) Field of Classification Search
CPC .. G06K 9/00805; G06K 9/6268; G06K 9/628; G06K 9/6282; G06F 16/2246;
(Continued)

(56) References Cited

U.S. PATENT DOCUMENTS 9,147,168 B1* 9/2015 Ao ...................... G06F 16/9027
9,787,647 B2* 10/2017 Wu .......................... G06N 5/02
(Continued)

FOREIGN PATENT DOCUMENTS

CN 105835777 A 8/2016
CN 106709475 A * 5/2017
(Continued)

OTHER PUBLICATIONS

Wang; Relevance of the Research on Collision Detection Algorithm Based on AABB Bounding Box to the present application and English Translation; 4 pages. Oct. 15, 2007.
(Continued)

*Primary Examiner* — Samir A Ahmed
(74) *Attorney, Agent, or Firm* — Pearne & Gordon LLP

(57) ABSTRACT

An obstacle classification method and apparatus based on unmanned vehicle, a device, and a storage medium are provided. The method includes: obtaining obstacle information of a plurality of obstacles detected by a detection device of the unmanned vehicle; and performing classification processing on the obstacle information using a compressed random forest model, to obtain a result of obstacle classification, where a non-leaf node of each decision tree of the compressed random forest model stores only feature index information, classification threshold index information and node position index information, the node position index information is left or right node position index information; a leaf node of each decision tree stores only class index information. Only part of information needs to be stored, and there is no need to occupy more memory and space of the unmanned vehicle system, thereby reducing the memory occupancy, and improving the speed and efficiency of classification.

15 Claims, 5 Drawing Sheets

(51) Int. Cl.
  *G06K 9/62* (2022.01)
  *G06N 5/00* (2006.01)
  *G06N 5/04* (2006.01)

(52) U.S. Cl.
  CPC ........... *G06K 9/6268* (2013.01); *G06N 5/003* (2013.01); *G06N 5/04* (2013.01)

(58) Field of Classification Search
  CPC ........ G06N 5/003; G06N 5/04; G01S 17/931; G01S 15/931; G01S 17/06; G01S 17/50
  See application file for complete search history.

(56) References Cited

U.S. PATENT DOCUMENTS

| | | | | |
|---|---|---|---|---|
| 10,699,051 | B1* | 6/2020 | Zhang | G06F 30/392 |
| 2011/0178976 | A1* | 7/2011 | Nishiyama | G06N 5/02 |
| | | | | 706/52 |
| 2014/0337269 | A1* | 11/2014 | Eads | G06N 5/02 |
| | | | | 706/46 |
| 2015/0262064 | A1* | 9/2015 | Burger | G06F 16/9027 |
| | | | | 706/46 |
| 2015/0356376 | A1* | 12/2015 | Burghouts | G06K 9/4642 |
| | | | | 382/159 |
| 2018/0253980 | A1 | 9/2018 | Mohamadi | |
| 2018/0276564 | A1* | 9/2018 | Varma | G06N 5/04 |
| 2019/0287023 | A1* | 9/2019 | Kasahara | G06F 12/0607 |
| 2019/0332846 | A1* | 10/2019 | Wu | G06T 17/20 |

FOREIGN PATENT DOCUMENTS

| | | | | |
|---|---|---|---|---|
| CN | 107797973 | A | | 3/2018 |
| CN | 105835777 | A | * | 8/2018 |
| JP | H09505895 | A | | 6/1997 |
| JP | 2011150546 | A | | 8/2011 |
| JP | 2018106618 | A | | 7/2018 |

OTHER PUBLICATIONS

Zhang; Relevance of the Data Mining and Its Application in Customer Relationship Management to the present application and English Translation, 2 pages, Aug. 2007.
Liu; Relevance of the Introduction to the Database System to the present application and English Translation, 3 pages, Sep. 2015.
Cha et al.; Relevance of the Video Target Tracking Method to the present application and English Translation; 4 pages, 3 pages, Jul. 2015.
The First Office Action of the priority application No. 201811044529.8 dated Mar. 18, 2020, 12 pages.
https://github.com/nlohmann/service-technology.org/commits/master/genet/libs/alglib/dforest.cpp; 1 page.
Notice of Allowance of the parallel JP application No. CNBLUSP201904555; 3 pages.

* cited by examiner

OBSTACLE CLASSIFICATION METHOD AND APPARATUS BASED ON UNMANNED VEHICLE, DEVICE, AND STORAGE MEDIUM

CROSS-REFERENCE TO RELATED APPLICATIONS

This application claims priority to Chinese Patent Application No. 201811044529.8, filed on Sep. 7, 2018 and entitled "OBSTACLE CLASSIFICATION METHOD AND APPARATUS BASED ON UNMANNED VEHICLE, DEVICE, AND STORAGE", which is hereby incorporated by reference in its entirety.

TECHNICAL FIELD

Embodiments of the present application relate to the field of unmanned vehicle technologies and, in particular, to an obstacle classification method and apparatus based on an unmanned vehicle, a device, and a storage medium.

BACKGROUND

With the development of intelligent technology, unmanned vehicles are being developed and applied. During the driving of an unmanned vehicle, classes of obstacles around the unmanned vehicle need to be detected.

In the prior art, after obtaining obstacle information of an obstacle, the obstacle information is inputted into a random forest model to classify and identify the class of the obstacle. The existing random forest model has many tree structures, and each tree structure is provided with a plurality of nodes. A plurality of fields are set in the nodes, and each node is used to store information in the process of obstacle classification and identification.

However, in the prior art, when classifying and identifying classes of obstacles by applying the random forest model, a lot of information needs to be stored in the nodes of the random forest model, so that the system of the unmanned vehicle needs to store a lot of information, thereby occupying the memory and space of the system of the unmanned vehicle. Moreover, since it is required to conduct the storing of the information, the entire process of obstacle classification and identification is relatively slow and less efficient.

SUMMARY

Embodiments of the present application provide an obstacle classification method and apparatus based on an unmanned vehicle, a device, and a storage medium, for solving the problem in the above scheme that the orientation of obstacles cannot be determined correctly.

A first aspect of the present application provides an obstacle classification method based on an unmanned vehicle, including:

obtaining obstacle information of a plurality of obstacles detected by a detection device of the unmanned vehicle; and performing classification processing on the obstacle information of the plurality of obstacles using a compressed random forest model, to obtain a result of obstacle classification, where the compressed random forest model includes at least two decision trees; a non-leaf node of each decision tree of the at least two decision trees stores only feature index information, classification threshold index information and node position index information, where the node position index information is left node position index information or right node position index information, the left node position index information is used to indicate positions of a left node and a right node under the non-leaf node, and the right node position index information is used to indicate the positions of the left node and the right node under the non-leaf node; a leaf node of each decision tree stores only class index information.

Further, the performing classification processing on the obstacle information of the plurality of obstacles using a compressed random forest model, to obtain a result of obstacle classification includes:

distributing the obstacle information of the plurality of obstacles into the decision trees of the compressed random forest model;

performing, in each decision tree of the compressed random forest model, classification processing on the obstacle information inputted into the each decision tree, to obtain obstacle class information outputted from the leaf node of each decision tree; and obtaining the result of the obstacle classification according to the obstacle class information outputted from the leaf node of each decision tree.

Further, the performing, in each decision tree of the compressed random forest model, classification processing on the obstacle information inputted into the each decision tree, to obtain obstacle class information outputted from the leaf node of each decision tree includes:

performing, in each decision tree of the compressed random forest model, the classification processing on the obstacle information inputted into the each decision tree, and determining whether or not the non-leaf node of each decision tree has the left node or the right node;

storing the feature index information, the classification threshold index information, and the right node position index information in the non-leaf node of each decision tree if it is determined that the non-leaf node of the each decision tree has the right node but does not have the left node;

storing the feature index information, the classification threshold index information, and the left node position index information in the non-leaf node of each decision tree if it is determined that the non-leaf node of the each decision tree has the left node but does not have the right node;

storing the feature index information and the classification threshold index information in the non-leaf node of each decision tree, and store the left node position index information or the right node position index information in the non-leaf node of each decision tree, if it is determined that the non-leaf node of the each decision tree has both the left node and the right node; and obtaining, according to a process of the classification processing, the obstacle class information outputted from the leaf node of each decision tree.

Further, after the performing classification processing on the obstacle information of the plurality of obstacles using a compressed random forest model, to obtain a result of obstacle classification, the method further includes:

storing information that is stored in the leaf node of each decision tree of the compressed random forest model into a parent node corresponding to the leaf node; and deleting the leaf node of each decision tree of the compressed random forest model.

Further, the non-leaf node includes a root node, a node having a child node and a parent node.

Further, the left node position index information is information on a relative address of the left node of each node in the decision tree relative to the right node of the each node;

the right node position index information is information on a relative address of the right node of each node in the decision tree relative to the left node of the each node.

Further, a field of the feature index information occupies 2 bytes, a field of the class index information occupies 2 bytes, a field of the classification threshold index information occupies 4 bytes, a field of the left node position index information occupies 4 bytes, and a field of the right node position index information occupies 4 bytes.

Further, the detection device is any one of the following: a laser radar sensor, ultrasonic radar, an image detector, and an infrared detection device.

Further, the obstacle information includes at least one of the following:

a movement speed of an obstacle, a volume of the obstacle, heat of the obstacle, and a distance between the obstacle and the unmanned vehicle.

A second aspect of the present application provides an obstacle classification apparatus based on an unmanned vehicle, including:

an obtaining unit, configured to obtain obstacle information of a plurality of obstacles detected by a detection device of the unmanned vehicle; and a classification unit, configured to perform classification processing on the obstacle information of the plurality of obstacles using a compressed random forest model, to obtain a result of obstacle classification, where the compressed random forest model includes at least two decision trees; a non-leaf node of each decision tree of the at least two decision trees stores only feature index information, classification threshold index information and node position index information, where the node position index information is left node position index information or right node position index information, the left node position index information is used to indicate positions of a left node and a right node under the non-leaf node, and the right node position index information is used to indicate the positions of the left node and the right node under the non-leaf node; a leaf node of each decision tree stores only class index information.

Further, the classification unit includes:

a distribution module, configured to distribute the obstacle information of the plurality of obstacles into the decision trees of the compressed random forest model;

a classification module, configured to perform, in each decision tree of the compressed random forest model, classification processing on the obstacle information inputted into the each decision tree, to obtain obstacle class information outputted from the leaf node of each decision tree; and a determining module, configured to obtain the result of the obstacle classification according to the obstacle class information outputted from the leaf node of each decision tree.

Further, the classification module includes:

a classification submodule, configured to perform, in each decision tree of the compressed random forest model, classification processing on the obstacle information inputted into the each decision tree, and determine whether or not the non-leaf node of each decision tree has the left node or the right node;

a first determining submodule, configured to store the feature index information, the classification threshold index information, and the right node position index information in the non-leaf node of each decision tree if it is determined that the non-leaf node of the each decision tree has the right node but does not have the left node;

a second determining submodule, configured to store the feature index information, the classification threshold index information, and the left node position index information in the non-leaf node of each decision tree if it is determined that the non-leaf node of the each decision tree has the left node but does not have the right node;

a third determining submodule, configured to store the feature index information and the classification threshold index information in the non-leaf node of each decision tree, and store the left node position index information or the right node position index information in the non-leaf node of each decision tree, if it is determined that the non-leaf node of the each decision tree has both the left node and the right node; and a fourth determining submodule, configured to obtain, according to a process of the classification processing, the obstacle class information outputted from the leaf node of each decision tree.

Further, the apparatus further includes:

a storing unit, configured to store information that is stored in the leaf node of each decision tree of the compressed random forest model into a parent node corresponding to the leaf node after the classification unit performs the classification processing on the obstacle information of the plurality of obstacles using the compressed random forest model and obtains the result of the obstacle classification; and a deleting unit, configured to delete the leaf node of each decision tree of the compressed random forest model.

Further, the non-leaf node includes a root node, a node having a child node and a parent node.

Further, the left node position index information is information on a relative address of the left node of each node in the decision tree relative to the right node of the each node; the right node position index information is information on a relative address of the right node of each node in the decision tree relative to the left node of the each node.

Further, a field of the feature index information occupies 2 bytes, a field of the class index information occupies 2 bytes, a field of the classification threshold index information occupies 4 bytes, a field of the left node position index information occupies 4 bytes, and a field of the right node position index information occupies 4 bytes.

Further, the detection device is any one of the following: a laser radar sensor, ultrasonic radar, an image detector, and an infrared detection device.

Further, the obstacle information includes at least one of the following:

a movement speed of an obstacle, a volume of the obstacle, heat of the obstacle, and a distance between the obstacle and the unmanned vehicle.

A third aspect of the present application provides a control device, including a transmitter, a receiver, a memory and a processor;

the memory is configured to store computer instructions; the processor is configured to execute the computer instructions stored in the memory to implement the obstacle classification method based on the unmanned vehicle according to any implementation of the first aspect.

A fourth aspect of the present application provides a storage medium, including a readable storage medium and computer instructions stored in the readable storage medium; the computer instructions are used to implement the obstacle classification method based on the unmanned vehicle according to any implementation of the first aspect.

Using the obstacle classification method and apparatus based on the unmanned vehicle, the device, and the storage medium provided by embodiments of the present application, the obstacle information of a plurality of obstacles detected by the detection device of the unmanned vehicle is obtained; the classification processing is performed on the obstacle information of the plurality of obstacles using the compressed random forest model, to obtain the result of the obstacle classification, where the compressed random forest model includes at least two decision trees; the non-leaf node of each decision tree of the at least two decision trees stores only the feature index information, the classification threshold index information and the node position index information, where the node position index information is the left node position index information or the right node position index information, the left node position index information is used to indicate the positions of the left node and the right node under the non-leaf node, and the right node position index information is used to indicate the positions of the left node and the right node under the non-leaf node; the leaf node of each decision tree stores only the class index information. Since only the feature index field, the classification threshold index field, and the left or right node position index field are set in the non-leaf node of each decision tree of the compressed random forest model, and only the class index field is set in the leaf node, only part of information needs to be stored when classifying and identifying obstacles using the compressed random forest model. There is no need to occupy more memory and space of the system of the unmanned vehicle, thereby reducing the memory occupancy. In addition, only a small amount of information needs to be stored synchronously during the classification, so that the speed and efficiency of the classification can be improved.

BRIEF DESCRIPTION OF THE DRAWINGS

In order to illustrate technical solutions in embodiments of the present application or in the prior art more clearly, accompanying drawings required for describing the embodiments or the prior art will be briefly described below. Apparently, the accompanying drawings in the following description are some of the embodiments of the present application, and other drawings can be obtained by those skilled in the art based on these accompanying drawings without any creative effort.

DESCRIPTION OF EMBODIMENTS

In order to make the objects, technical solutions and advantages of embodiments of the present application clearer, the technical solutions of the embodiments of the present application will be described below clearly and completely in conjunction with the accompanying drawings in the embodiments of the present application. Apparently, the described embodiments are a part of, instead of all of the embodiments of the present application. All other embodiments obtained by those skilled in the art based on the embodiments of the present application without creative effort shall fall within the scope of the present application.

In the prior art, after obtaining obstacle information of an obstacle, the obstacle information is inputted into a random forest model to classify and identify the class of the obstacle. The existing random forest model has many tree structures, and each tree structure is provided with a plurality of nodes. A plurality of fields are set in the nodes, and each node is used to store information in the process of obstacle classification and identification.

However, in the prior art, when classifying and identifying classes of obstacles by applying the random forest model, a lot of information needs to be stored in the nodes of the random forest model, so that the system of the unmanned vehicle needs to store a lot of information, thereby occupying the memory and space of the system of the unmanned vehicle. Moreover, since it is required to conduct the storing of the information, the entire process of obstacle classification and identification is relatively slow and less efficient.

In view of the above problem, the present application proposes an obstacle classification method and apparatus based on an unmanned vehicle, a device, and a storage medium, through which there is no need to occupy more memory and space of the system of the unmanned vehicle, thereby reducing the memory occupancy. In addition, only a small amount of information needs to be stored synchronously during the classification, so that the speed and efficiency of the classification can be improved. Such solutions will now be described in detail through several specific embodiments.

Figure 1:
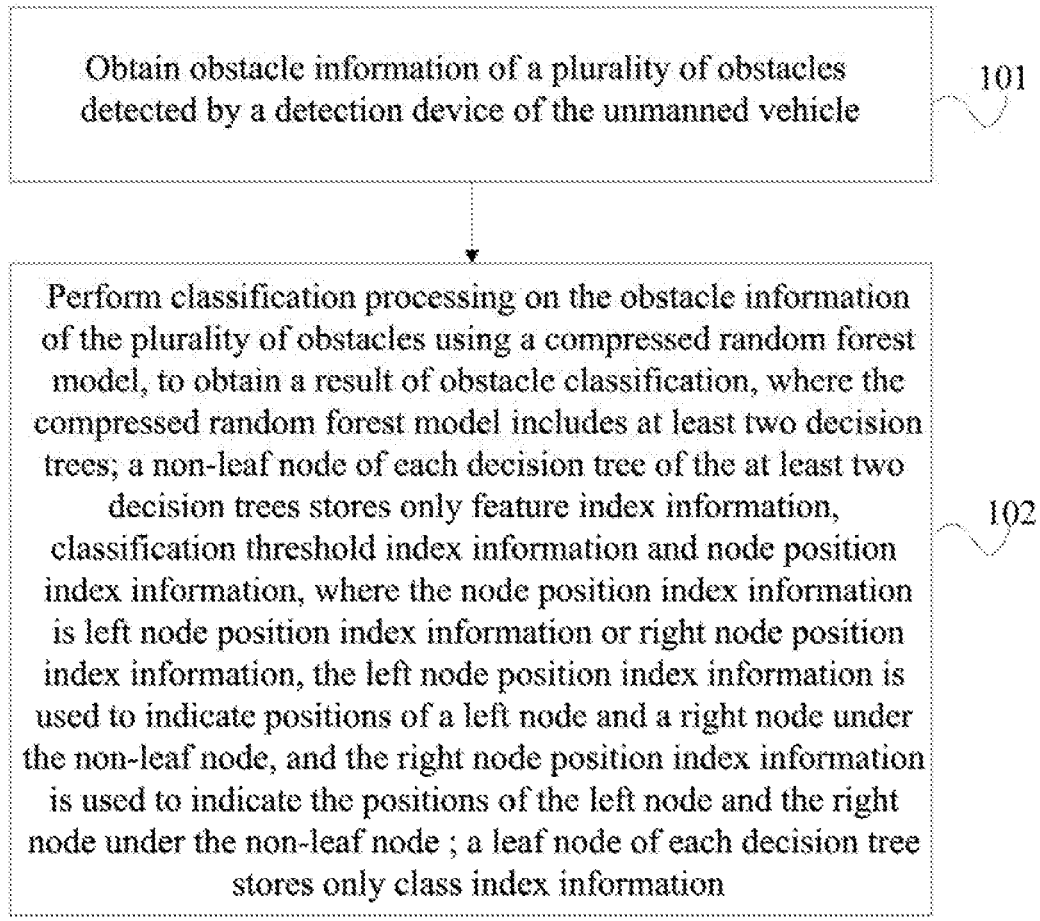
FIG. 1 is a flowchart of an obstacle classification method based on an unmanned vehicle according to an embodiment of the present application.

FIG. 1 is a flowchart of an obstacle classification method based on an unmanned vehicle according to an embodiment of the present application. As shown in FIG. 1, the executive entity of this solution is a controller of the unmanned vehicle, a control device of a self-driving system of the unmanned vehicle, etc. The obstacle classification method based on the unmanned vehicle includes the following steps.

Step 101: obtain obstacle information of a plurality of obstacles detected by a detection device of the unmanned vehicle.

Optionally, the detection device is any one of the following: a laser radar sensor, ultrasonic radar, an image detector, and an infrared detection device.

The obstacle information includes at least one of the following: a movement speed of an obstacle, a volume of the obstacle, heat of the obstacle, and a distance between the obstacle and the unmanned vehicle.

In this step, specifically, this embodiment is described by taking the controller of the unmanned vehicle as the executive entity.

At least one detection device is provided on the unmanned vehicle, and the detection device may be a laser radar sensor, ultrasonic radar, an image detector, an infrared detection device, or the like. The detection device is used to detect the obstacles around the unmanned vehicle to obtain the obstacle information of the obstacles. Then, the controller of the unmanned vehicle obtains the obstacle information of the plurality of obstacles from the detection device. The obstacle information of each obstacle includes an obstacle identifier for marking the obstacle.

For example, the controller of the unmanned vehicle obtains obstacle information of an obstacle 1, obstacle information of an obstacle 2, and obstacle information of an obstacle 3. The obstacle information of the obstacle 1 includes an obstacle identifier A, the obstacle information of the obstacle 2 includes the obstacle identifier B, and the obstacle information of the obstacle 3 includes the obstacle identifier C.

For example, point cloud data of an obstacle may be obtained using a laser radar sensor or ultrasonic radar. The controller of the unmanned vehicle determines position information of the obstacle according to the point cloud data of the obstacle. The controller of the unmanned vehicle determines position information of the unmanned vehicle according to a Global Positioning System (GPS). Then, the controller of the unmanned vehicle calculates the distance between the obstacle and the unmanned vehicle based on the position information of the obstacle and the position information of the unmanned vehicle.

More specifically, the point cloud data of the obstacle may be obtained using the laser radar sensor or the ultrasonic radar. The controller of the unmanned vehicle determines the position information of the obstacle at different times according to the point cloud data of the obstacle. The controller of the unmanned vehicle calculates displacement information of the obstacle within a period of time according to the position information of the obstacle at different times. Then, the controller of the unmanned vehicle calculates the movement speed of the obstacle according to the displacement information of the obstacle within the period of time and the corresponding time.

For another example, an infrared detection device may be used to detect heat information of the obstacle, and then the controller of the unmanned vehicle obtains the heat of the obstacle.

For still another example, an image detector may be used to obtain an image of the obstacle. The controller of the unmanned vehicle extracts the outline size of the obstacle according to the image of the obstacle, and the controller of the unmanned vehicle calculates the distance between the obstacle and the unmanned vehicle according to the position information of the obstacle and the position information of the unmanned vehicle. Then, the controller of the unmanned vehicle calculates the volume of the obstacle according to the outline size of the obstacle and the distance between the obstacle and the unmanned vehicle.

Step 102: perform classification processing on the obstacle information of the plurality of obstacles using a compressed random forest model, to obtain a result of obstacle classification, where the compressed random forest model includes at least two decision trees; a non-leaf node of each decision tree of the at least two decision trees stores only feature index information, classification threshold index information and node position index information, where the node position index information is left node position index information or right node position index information, the left node position index information is used to indicate positions of a left node and a right node under the non-leaf node, and the right node position index information is used to indicate the positions of the left node and the right node under the non-leaf node; a leaf node of each decision tree stores only class index information.

Optionally, the non-leaf node includes a root node, a node having a child node and a parent node.

Optionally, the left node position index information is information on a relative address of a left node of each node in the decision tree relative to a right node of the each node. The right node position index information is information on a relative address of a right node of each node in the decision tree relative to a left node of the each node.

In this step, specifically, the controller of the unmanned vehicle stores the compressed random forest model. In the compressed random forest model, information that is required to be maintained by each node in the compressed random forest model is preset, so that only a portion of the fields in the prior art are set for each node.

In the prior art, each node of each decision tree includes a feature index field, a class index field, a classification threshold field, a left node position index field, and a right node position index field.

Specifically, the compressed random forest model has a plurality of decision trees, and the decision trees may be binary trees. Each decision tree has one or more nodes. For each decision tree, the nodes in the decision tree may be divided into two types, which are non-leaf nodes and leaf nodes, respectively. A root node belongs to the non-leaf node, and a node having both a child node and a parent node also belongs to the non-leaf node. Only a feature index field, a classification threshold index field, and a node position index field may be set in the non-leaf node of each decision tree; and only a class index field is set in the leaf node of each decision tree.

Thus, during the performing of classification processing on the obstacle information of the plurality of obstacles using the compressed random forest model, for the fields of each non-leaf node of each decision tree, the feature index information is stored in the feature index field, the classification threshold index information is stored in the classification threshold index field, and the node position index information is stored in the node position index field.

The node position index information is left node position index information or right node position index information, that is, a non-leaf node may store only a position of a left node or a position of a right node. This is because in the present application, the left node position index information may be used to indicate the positions of the left node and the right node under the non-leaf node, or the right node position index information may be used to indicate the positions of the left node and the right node under the non-leaf node. Specifically, in the present application, the left node position index information and the right node position index information adopt a relative address, where the left node position index information is the information on the relative address of the left node of each node in the decision tree relative to the right node of the each node, and the right node position index information is the information on the relative address of the right node of each node in the decision tree relative to the left node of the each node. Therefore, the left node position index information directly indicates the position of the left node, and the position of the right node can be determined according to the left node position index information; the right node position index information directly indicates the position of the right node, and the position of the left node can be determined according to the right node position index information. For example, the position of the left node is adjacent to the position of the right node, and only the left node position index field or the right node position index field may be set in the non-leaf node, so that the left node position index information or the right node position index information is stored in the non-leaf node to indicate the positions of the left node and the right node.

During the performing of classification processing on the obstacle information of the plurality of obstacles using the compressed random forest model, for the fields of each leaf node of each decision tree, the class index information is stored in the class index field.

The result of the obstacle classification can be obtained after performing the classification processing on the obstacle information of the plurality of obstacles using the compressed random forest model. The result of the obstacle classification includes at least one obstacle combination of a class of obstacles, each obstacle combination includes at least one obstacle identifier, and the obstacles in each obstacle combination belong to the same class.

Figure 2:
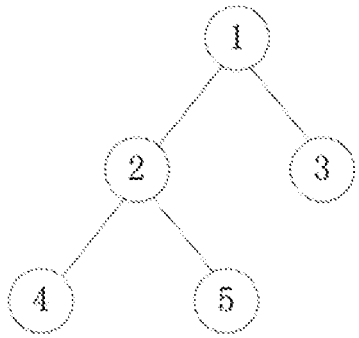
FIG. 2 is a schematic diagram of a decision tree in a compressed random forest model of an obstacle classification method based on an unmanned vehicle according to an embodiment of the present application.

FIG. 2 is a schematic diagram of a decision tree in a compressed random forest model of an obstacle classification method based on an unmanned vehicle according to an embodiment of the present application. As shown in FIG. 2, obstacle information of each of an obstacle 1, an obstacle 2, an obstacle 3, an obstacle 4 and an obstacle 5 is obtained, and the obstacle information is inputted into a decision tree of the compressed random forest model. At a root node of the decision tree, according to the traveling speed of the obstacle, the obstacle 1, the obstacle 2 and the obstacle 3 whose traveling speed is greater than a speed threshold are inputted to a node 2 under the root node, and the obstacle 4 and the obstacle 5 whose traveling speed is less than or equal to the speed threshold are inputted to a node 3 under the root node. The feature index information stored on the root node is a speed feature, the classification threshold index information stored on the root node is the speed threshold, and the node position index information stored on the root node is position information of the node 2 or position information of the node 3. At the node 3, the obstacle 4 and the obstacle 5 are no longer classified, and the class index information stored on the node 3 is that the traveling speed is less than or equal to the speed threshold. At the node 2, the obstacle 1, the obstacle 2 and the obstacle 3 are classified according to the heat of the obstacle, where the obstacle 1 and the obstacle 2 whose heat is greater than a heat threshold are inputted to a node 4 under the node 2, and the obstacle 3 whose heat is less than or equal to the heat threshold is inputted to a node 5 under the node 2. The feature index information stored on the node 2 is a heat feature, the classification threshold index information stored on the node 2 is the heat threshold, and the node position index information stored on the node 2 is position information of the node 4 or position information of the node 5. At the node 4, the obstacle 1 and the obstacle 2 are no longer classified, and the class index information stored on the node 4 is that the traveling speed is greater than the speed threshold and the heat is greater than the heat threshold. At the node 5, the obstacle 3 is no longer classified, and the class index information stored on the node 5 is that the traveling speed is greater than the speed threshold and the heat is less than or equal to the heat threshold. Thus, a first class of obstacles are obtained as obstacles whose traveling speed is less than or equal to the speed threshold, a second class of obstacles are obtained as obstacles whose traveling speed is greater than the speed threshold and whose heat is greater than the heat threshold, and a third class of obstacles are obtained as obstacles whose traveling speed is greater than the speed threshold and whose heat is less than or equal to the heat threshold.

The node 1, the node 2, the node 3, the node 4, and the node 5 are included in the decision tree shown in FIG. 2, where the node 1 and the node 2 are non-leaf nodes, the node 3, the node 4 and the node 5 are leaf nodes. Only the feature index field, the classification threshold index field and the node position index field are set in the node 1, where the feature index information stored in the feature index field of the node 1 is the speed feature, the classification threshold index information stored in the classification threshold index field of the node 1 is the speed threshold, and the node position index information stored in the node position index field of the node 1 is the position information of the node 2 or the position information of the node 3. Only the class index field is set in the node 3, and the class index information stored in the class index field of the node 3 is that the traveling speed is less than or equal to the speed threshold. Only the feature index field, the classification threshold index field and the node position index field are set in the node 2, where the feature index information stored in the feature index field of the node 2 is the heat feature, the classification threshold index information stored in the classification threshold index field of the node 2 is the heat threshold, and the node position index information stored in the node position index field of the node 2 is the position information of the node 4 or the position information of the node 5. Only the class index field is set in the node 4, and the class index information stored in the class index field of the node 4 is that the traveling speed is greater than the speed threshold and the heat is greater than the heat threshold. Only the class index field is set in the node 5, and the class index information stored in the class index field of the node 5 is that the traveling speed is greater than the speed threshold and the heat is less than or equal to the heat threshold.

In this embodiment, the obstacle information of a plurality of obstacles detected by the detection device of the unmanned vehicle is obtained; the classification processing is performed on the obstacle information of the plurality of obstacles using the compressed random forest model, to obtain the result of the obstacle classification, where the compressed random forest model includes at least two decision trees; the non-leaf node of each decision tree of the at least two decision trees stores only the feature index information, the classification threshold index information and the node position index information, where the node position index information is the left node position index information or the right node position index information, the left node position index information is used to indicate the positions of the left node and the right node under the non-leaf node, and the right node position index information is used to indicate the positions of the left node and the right node under the non-leaf node; the leaf node of each decision tree stores only the class index information. Since only the feature index field, the classification threshold index field, and the left or right node position index field are set in the non-leaf node of each decision tree of the compressed random forest model, and only the class index field is set in the leaf node, only part of information needs to be stored when classifying and identifying obstacles using the compressed random forest model. There is no need to occupy more memory and space of the system of the unmanned vehicle, thereby reducing the memory occupancy. In addition, only a small amount of information needs to be stored synchronously during the classification, so that the speed and efficiency of the classification can be improved.

Figure 3:
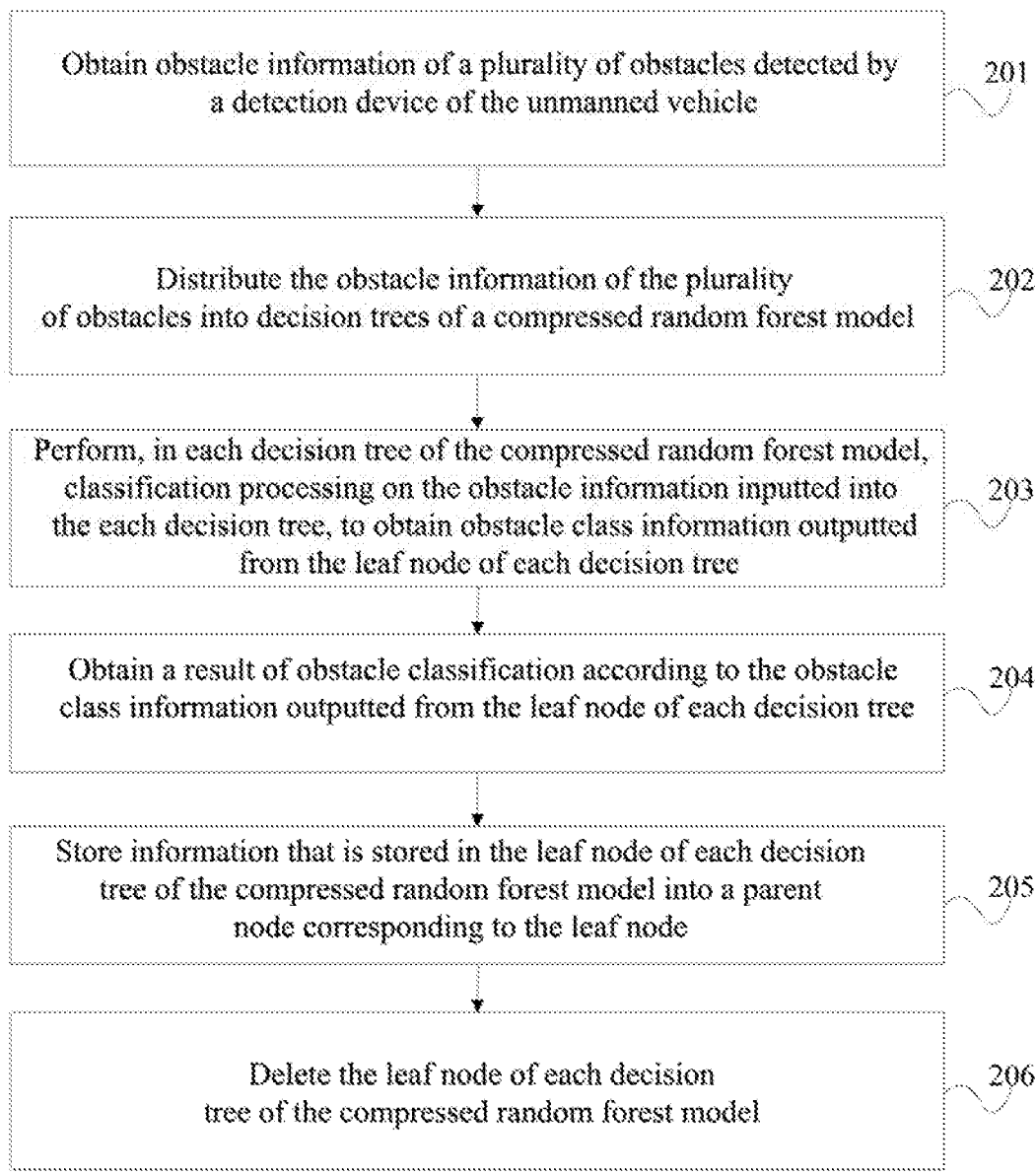
FIG. 3 is a flowchart of another obstacle classification method based on an unmanned vehicle according to an embodiment of the present application.

FIG. 3 is a flowchart of another obstacle classification method based on an unmanned vehicle according to an embodiment of the present application. As shown in FIG. 3, the executive entity of this solution is a controller of the unmanned vehicle, a control device of a self-driving system of the unmanned vehicle, etc. The obstacle classification method based on the unmanned vehicle includes the following steps.

Step 201: obtain obstacle information of a plurality of obstacles detected by a detection device of the unmanned vehicle.

In this embodiment, specifically, this embodiment is described by taking the controller of the unmanned vehicle as the executive entity. For this step, please refer to the step 101 of FIG. 1, which will not be repeated here.

Step 202: distribute the obstacle information of the plurality of obstacles into decision trees of a compressed random forest model.

The compressed random forest model includes at least two decision trees; a non-leaf node of each decision tree of the at least two decision trees stores only feature index information, classification threshold index information and node position index information, where the node position index information is left node position index information or right node position index information, the left node position index information is used to indicate positions of a left node and a right node under the non-leaf node, and the right node position index information is used to indicate the positions of the left node and the right node under the non-leaf node; a leaf node of each decision tree stores only class index information.

Optionally, the field of the feature index information occupies 2 bytes, the field of the class index information occupies 2 bytes, the field of the classification threshold index information occupies 4 bytes, the field of the left node position index information occupies 4 bytes, and the field of the right node position index information occupies 4 bytes.

In this embodiment, specifically, the plurality of obstacles can be first classified according to a preset feature, and then the obstacle information of the plurality of obstacles can be distributed to the decision tree of the compressed random forest model. For example, according to the distance between the obstacle and the unmanned vehicle, the obstacles, of which the distances belong to different distance segments, are distributed into the decision trees.

The decision tree may adopt the decision tree structure and the information storing process as described in the step 102 shown in FIG. 1, which will not be repeated here.

Step 203: perform, in each decision tree of the compressed random forest model, classification processing on the obstacle information inputted into the each decision tree, to obtain obstacle class information outputted from the leaf node of each decision tree.

The step 203 specifically includes the following steps.

Step 2031: perform, in each decision tree of the compressed random forest model, classification processing on the obstacle information inputted into the each decision tree, and determine whether or not the non-leaf node of each decision tree has a left node or a right node.

Step 2032: store the feature index information, the classification threshold index information, and the right node position index information in the non-leaf node of each decision tree if it is determined that the non-leaf node of the each decision tree has the right node but does not have the left node.

Step 2033: store the feature index information, the classification threshold index information, and the left node position index information in the non-leaf node of each decision tree if it is determined that the non-leaf node of the each decision tree has the left node but does not have the right node.

Step 2034: store the feature index information and the classification threshold index information in the non-leaf node of each decision tree, and store the left node position index information or the right node position index information in the non-leaf node of each decision tree, if it is determined that the non-leaf node of the each decision tree has both the left node and the right node.

Step 2035: obtain, according to the process of the classification processing, obstacle class information outputted from the leaf node of each decision tree.

In this embodiment, specifically, for each of the above decision trees, the controller of the unmanned vehicle performs classification processing on the obstacle information in each decision tree according to a decision tree classification rule provided in the prior art, and each leaf node of the decision tree can output one piece of obstacle class information. The obstacle class information includes an obstacle class identifier and at least one obstacle identifier, where the obstacle class identifier represents that the obstacles corresponding to each obstacle class identifier belong to the same class, that is, each leaf node outputs obstacle identifiers of obstacles belonging to the same class.

During the above classification processing, whether or not the non-leaf node of the decision tree has the left node or the right node can be determined according to the obstacle classification process. When it is determined that the non-leaf node has the right node but does not have the left node, the controller of the unmanned vehicle determines that the node position index field in the non-leaf node stores the right node position index information, and that the non-leaf node has only the feature index field, the classification threshold index field, and the node position index field, so that the feature index information, the classification threshold index information, and the right node position index information can be stored in the non-leaf node.

When it is determined that the non-leaf node has the left node but does not have the right node, the controller of the unmanned vehicle determines that the node position index field in the non-leaf node stores the left node position index information, and that the non-leaf node has only the feature index field, the classification threshold index field, and the node position index field, so that the feature index information, the classification threshold index information, and the left node position index information can be stored in the non-leaf node.

When it is determined that the non-leaf node has both the left node and the right node, the controller of the unmanned vehicle determines that the node position index field in the non-leaf node stores the left node position index information or the right node position index information, and that the non-leaf node has only the feature index field, the classification threshold index field, and the node position index field, so that the feature index information and the classification threshold index information can be stored in the non-leaf node, and the left node position index information or the right node position index information can be stored in the non-leaf node.

Figure 4:
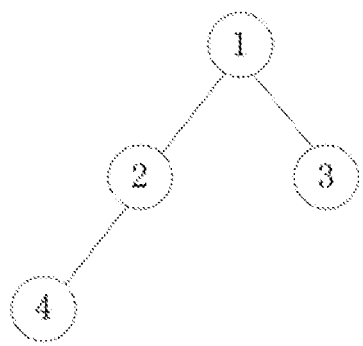
FIG. 4 is a schematic diagram of a decision tree in a compressed random forest model of another obstacle classification method based on an unmanned vehicle according to an embodiment of the present application.

For example, FIG. 4 is a schematic diagram of a decision tree in a compressed random forest model of another obstacle classification method based on an unmanned vehicle according to an embodiment of the present application. As shown in FIG. 4, obstacle information of each of an obstacle 1, an obstacle 2, an obstacle 3 and an obstacle 4 is obtained, and the obstacle information is inputted into a decision tree of the compressed random forest model. At a root node of the decision tree, according to the traveling speed of the obstacle, the obstacle 1, the obstacle 2 and the obstacle 3 whose traveling speed is greater than a speed threshold are inputted to a node 2 under the root node, and the obstacle 4 whose traveling speed is less than or equal to the speed threshold is inputted to a node 3 under the root node. The feature index information stored on the root node is a speed feature, the classification threshold index information stored on the root node is the speed threshold, and since the root node has both the left node and the right node, the node position index information stored on the root node is position information of the node 2 or position information of the node 3. At the node 3, the obstacle 4 is no longer classified, and the class index information stored on the node 3 is that the traveling speed is less than or equal to the speed threshold. At the node 2, the obstacle 1, the obstacle 2 and the obstacle 3 are classified according to the heat of the obstacle, where the obstacle 1, the obstacle 2 and the obstacle 3 whose heat is greater than a heat threshold are inputted to a node 4 under the node 2. The feature index information stored on the node 2 is a heat feature, the classification threshold index information stored on the node 2 is the heat threshold, and since the node 2 has only the left node, the node position index information stored on the node 2 is position information of the node 4. At the node 4, the obstacle 1, the obstacle 2 and the obstacle 3 are no longer classified, and the class index information stored on the node 4 is that the traveling speed is greater than the speed threshold and the heat is greater than the heat threshold. Thus, a first class of obstacles are obtained as obstacles whose traveling speed is less than or equal to the speed threshold, and a second class of obstacles are obtained as obstacles whose traveling speed is greater than the speed threshold and whose heat is greater than the heat threshold.

The node 1, the node 2, the node 3, and the node 4 are included in the decision tree shown in FIG. 4, where the node 1 and the node 2 are non-leaf nodes, the node 3 and the node 4 are leaf nodes. Only the feature index field, the classification threshold index field and the node position index field are set in the node 1, where the feature index information stored in the feature index field of the node 1 is the speed feature, the classification threshold index information stored in the classification threshold index field of the node 1 is the speed threshold, and the node position index information stored in the node position index field of the node 1 is the position information of the node 2 or the position information of the node 3. Only the class index field is set in the node 3, and the class index information stored in the class index field of the node 3 is that the traveling speed is less than or equal to the speed threshold. Only the feature index field, the classification threshold index field and the node position index field are set in the node 2, where the feature index information stored in the feature index field of the node 2 is the heat feature, the classification threshold index information stored in the classification threshold index field of the node 2 is the heat threshold, and the node position index information stored in the node position index field of the node 2 is the position information of the node 4. Only the class index field is set in the node 4, and the class index information stored in the class index field of the node 4 is that the traveling speed is greater than the speed threshold and the heat is greater than the heat threshold.

Moreover, the field of the feature index information in each decision tree may occupy 2 bytes, the field of the class index information in each decision tree may occupy 2 bytes, the field of the classification threshold index information in each decision tree may occupy 4 bytes, the field of the left node position index information in each decision tree may occupy 4 bytes, and the field of the right node position index information in each decision tree may occupy 4 bytes. Thus, the non-leaf node can store only 2+4+4=10 bytes of data, and the leaf node can store only 2 bytes of data.

Step 204: obtain a result of obstacle classification according to the obstacle class information outputted from the leaf node of each decision tree.

In this embodiment, specifically, since each leaf node of the decision tree can output one piece of obstacle class information, i.e., each leaf node outputs the obstacle identifiers of obstacles belonging to the same class, the result of the obstacle classification can be obtained by summarizing according to the obstacle class information outputted from the leaf nodes of all decision trees.

Step 205: store information that is stored in the leaf node of each decision tree of the compressed random forest model into a parent node corresponding to the leaf node.

In this embodiment, specifically, since the leaf node of each decision tree can store only the class index information, there will be no other nodes under the leaf node. The information stored in the leaf node can be transferred to the non-leaf node corresponding to the leaf node, that is, the information stored in the leaf node is stored in the parent node corresponding to the leaf node.

Step 206: delete the leaf node of each decision tree of the compressed random forest model.

In this embodiment, specifically, since the class index information stored in the leaf node is stored in the parent node corresponding to the leaf node after the step 205, the leaf node of each decision tree can be deleted to avoid the leaf node from occupying memory space.

For example, for the decision tree shown in FIG. 4, the class index information stored in the node 3 can be transferred to the node 1, and then the node 3 is deleted, so that the feature index information stored in the feature index field of the node 1 is the speed feature, the classification threshold index information stored in the classification threshold index field of the node 1 is the speed threshold, the node position index information stored in the node position index field of the node 1 is the position information of the node 2, and the class index information stored in the preset field of the node 1 is that the traveling speed is less than or equal to the speed threshold. Similarly, for the decision tree shown in FIG. 4, the class index information stored in the node 4 can be transferred to the node 2, and then the node 4 is deleted.

In this embodiment, only the feature index field, the classification threshold index field, and the left or right node position index field are set for the non-leaf node in each decision tree of the compressed random forest model, and only the class index field is set for the leaf node. Therefore, only part of information needs to be stored when classifying and identifying obstacles using the compressed random forest model. There is no need to occupy more memory and space of the system of the unmanned vehicle, thereby reducing the memory occupancy. In addition, only a small amount of information needs to be stored synchronously during the classification, so that the speed and efficiency of the classification can be improved. Furthermore, the information of the leaf node in the decision tree can be stored in the parent node corresponding to the leaf node, and then the leaf node can be deleted, which further reduces the data generated by the classification and identification, thereby reducing the memory occupancy of the system of the unmanned vehicle.

Figure 5:
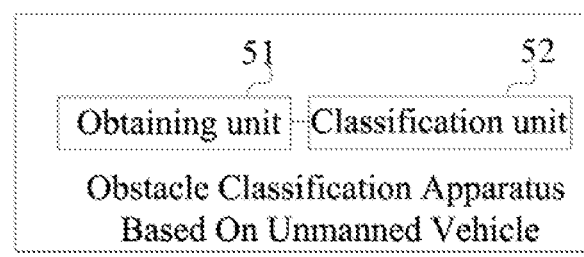
FIG. 5 is a schematic structural diagram of an obstacle classification apparatus based on an unmanned vehicle according to an embodiment of the present application.

FIG. 5 is a schematic structural diagram of an obstacle classification apparatus based on an unmanned vehicle according to an embodiment of the present application. As shown in FIG. 5, the obstacle classification apparatus based on the unmanned vehicle according to this embodiment includes:

an obtaining unit 51, configured to obtain obstacle information of a plurality of obstacles detected by a detection device of the unmanned vehicle; and a classification unit 52, configured to perform classification processing on the obstacle information of the plurality of obstacles using a compressed random forest model, to obtain a result of obstacle classification, where the compressed random forest model includes at least two decision trees; a non-leaf node of each decision tree of the at least two decision trees stores only feature index information, classification threshold index information and node position index information, where the node position index information is left node position index information or right node position index information, the left node position index information is used to indicate positions of a left node and a right node under the non-leaf node, and the right node position index information is used to indicate the positions of the left node and the right node under the non-leaf node; a leaf node of each decision tree stores only class index information.

The technical solution of the obstacle classification apparatus based on the unmanned vehicle provided by this embodiment is similar to the technical solution of the obstacle classification method based on the unmanned vehicle provided by any one of the above embodiments, and their implementation principles are similar, which will not be repeated here.

In this embodiment, the obstacle information of a plurality of obstacles detected by the detection device of the unmanned vehicle is obtained; the classification processing is performed on the obstacle information of the plurality of obstacles using the compressed random forest model, to obtain the result of the obstacle classification, where the compressed random forest model includes at least two decision trees; the non-leaf node of each decision tree of the at least two decision trees stores only the feature index information, the classification threshold index information and the node position index information, where the node position index information is the left node position index information or the right node position index information, the left node position index information is used to indicate the positions of the left node and the right node under the non-leaf node, and the right node position index information is used to indicate the positions of the left node and the right node under the non-leaf node; the leaf node of each decision tree stores only the class index information. Since only the feature index field, the classification threshold index field, and the left or right node position index field are set in the non-leaf node of each decision tree of the compressed random forest model, and only the class index field is set in the leaf node, only part of information needs to be stored when classifying and identifying obstacles using the compressed random forest model. There is no need to occupy more memory and space of the system of the unmanned vehicle, thereby reducing the memory occupancy. In addition, only a small amount of information needs to be stored synchronously during the classification, so that the speed and efficiency of the classification can be improved.

Figure 6:
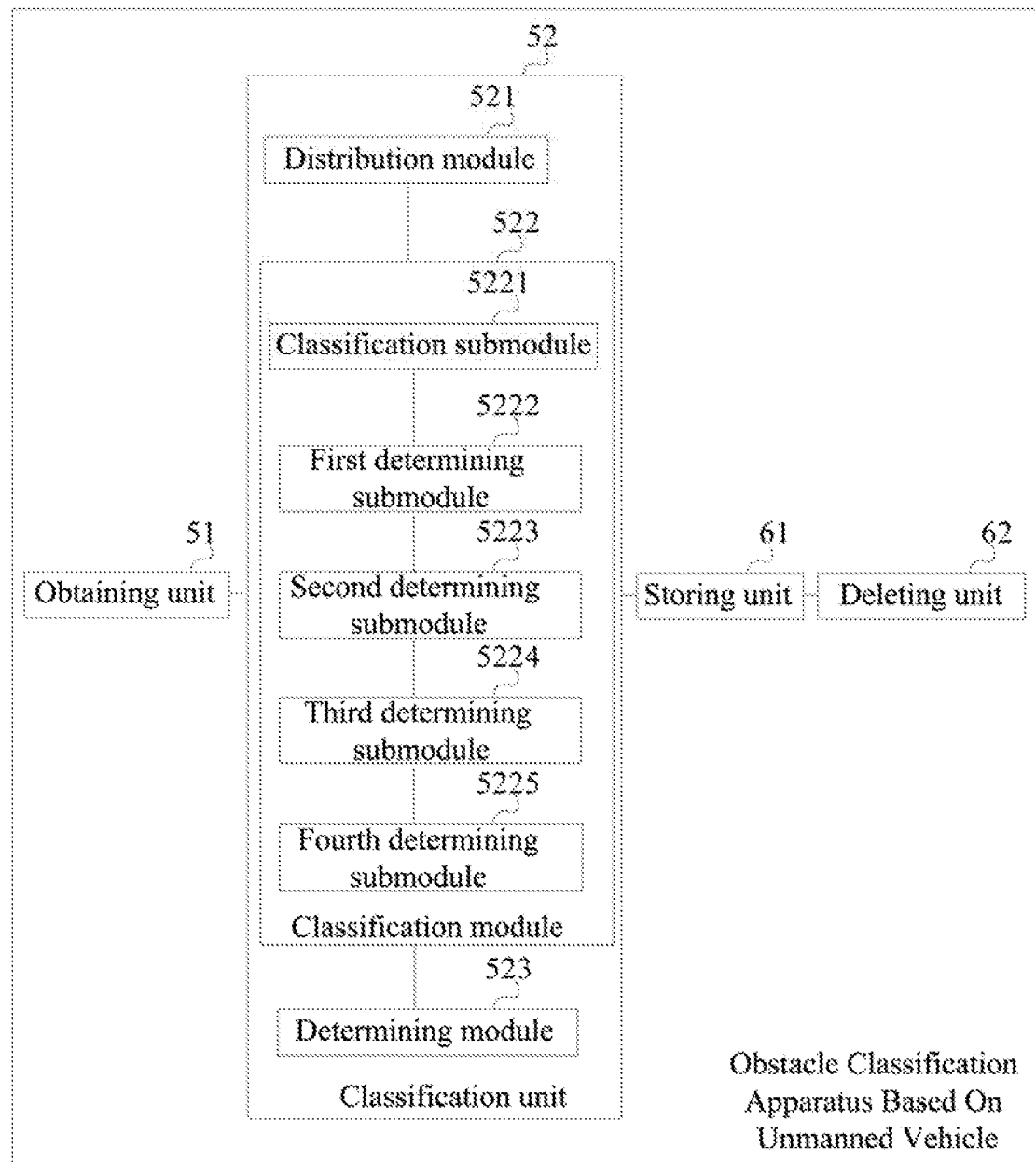
FIG. 6 is a schematic structural diagram of another obstacle classification apparatus based on an unmanned vehicle according to an embodiment of the present application.

FIG. 6 is a schematic structural diagram of another obstacle classification apparatus based on an unmanned vehicle according to an embodiment of the present application. On the basis of the embodiment shown in FIG. 5, as shown in FIG. 6, the classification unit 52 in the obstacle classification apparatus based on the unmanned vehicle according to this embodiment includes:

a distribution module 521, configured to distribute the obstacle information of the plurality of obstacles into the decision trees of the compressed random forest model;

a classification module 522, configured to perform, in each decision tree of the compressed random forest model, classification processing on the obstacle information inputted into the each decision tree, to obtain obstacle class information outputted from the leaf node of each decision tree; and a determining module 523, configured to obtain the result of the obstacle classification according to the obstacle class information outputted from the leaf node of each decision tree.

The classification module 522 includes:

a classification submodule 5211, configured to perform, in each decision tree of the compressed random forest model, classification processing on the obstacle information inputted into the each decision tree, and determine whether or not the non-leaf node of each decision tree has the left node or the right node;

a first determining submodule 5222, configured to store the feature index information, the classification threshold index information, and the right node position index information in the non-leaf node of each decision tree if it is determined that the non-leaf node of the each decision tree has the right node but does not have the left node;

a second determining submodule 5223, configured to store the feature index information, the classification threshold index information, and the left node position index information in the non-leaf node of each decision tree if it is determined that the non-leaf node of the each decision tree has the left node but does not have the right node;

a third determining submodule 5224, configured to store the feature index information and the classification threshold index information in the non-leaf node of each decision tree, and store the left node position index information or the right node position index information in the non-leaf node of each decision tree, if it is determined that the non-leaf node of the each decision tree has both the left node and the right node; and a fourth determining submodule 5225, configured to obtain, according to the process of the classification processing, the obstacle class information outputted from the leaf node of each decision tree.

The apparatus provided by this embodiment further includes:

a storing unit 61, configured to store information that is stored in the leaf node of each decision tree of the compressed random forest model into a parent node corresponding to the leaf node after the classification unit 52 performs the classification processing on the obstacle information of the plurality of obstacles using the compressed random forest model and obtains the result of the obstacle classification; and a deleting unit 62, configured to delete the leaf node of each decision tree of the compressed random forest model.

The non-leaf node includes a root node, a node having a child node and a parent node.

The left node position index information is information on a relative address of the left node of each node in the decision tree relative to the right node of the each node. The right node position index information is information on a relative address of the right node of each node in the decision tree relative to the left node of the each node.

The field of the feature index information occupies 2 bytes, the field of the class index information occupies 2 bytes, the field of the classification threshold index information occupies 4 bytes, the field of the left node position index information occupies 4 bytes, and the field of the right node position index information occupies 4 bytes.

The detection device is any one of the following: a laser radar sensor, ultrasonic radar, an image detector, and an infrared detection device.

The obstacle information includes at least one of the following: a movement speed of an obstacle, a volume of the obstacle, heat of the obstacle, and a distance between the obstacle and the unmanned vehicle.

The technical solution of the obstacle classification apparatus based on the unmanned vehicle provided by this embodiment is similar to the technical solution of the obstacle classification method based on the unmanned vehicle provided by any one of the above embodiments, and their implementation principles are similar, which will not be repeated here.

In this embodiment, only the feature index field, the classification threshold index field, and the left or right node position index field are set for the non-leaf node in each decision tree of the compressed random forest model, and only the class index field is set for the leaf node. Therefore, only part of information needs to be stored when classifying and identifying obstacles using the compressed random forest model. There is no need to occupy more memory and space of the system of the unmanned vehicle, thereby reducing the memory occupancy. In addition, only a small amount of information needs to be stored synchronously during the classification, so that the speed and efficiency of the classification can be improved. Furthermore, the information of the leaf node in the decision tree can be stored in the parent node corresponding to the leaf node, and then the leaf node can be deleted, which further reduces the data generated by the classification and identification, thereby reducing the memory occupancy of the system of the unmanned vehicle.

Figure 7:
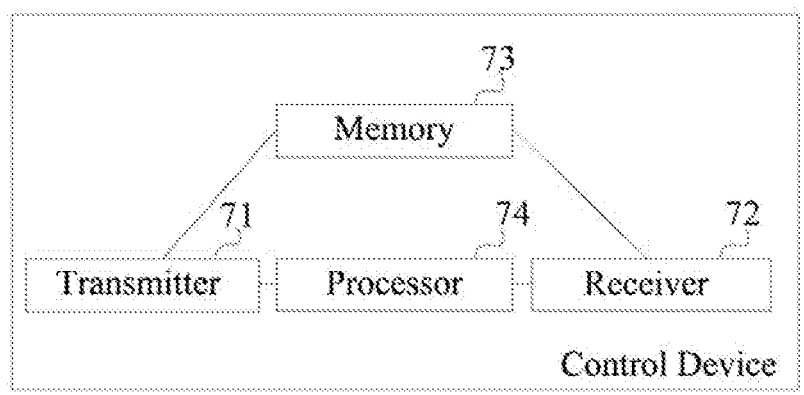
FIG. 7 is a schematic structural diagram of a control device according to an embodiment of the present application.

FIG. 7 is a schematic structural diagram of a control device according to an embodiment of the present application. As shown in FIG. 7, the control device includes a transmitter 71, a receiver 72, a memory 73, and a processor 74.

The memory 73 is configured to store computer instructions; the processor 74 is configured to execute the computer instructions stored in the memory 73 to implement the technical solution of the obstacle classification method based on the unmanned vehicle according to any implementation of the above embodiments.

The present application also provides a storage medium, including a readable storage medium and computer instructions stored in the readable storage medium, where the computer instructions are used to implement the technical solution of the obstacle classification method based on the unmanned vehicle according to any implementation of the above embodiments.

In a specific implementation of the control device, it should be understood that the processor 74 may be a central processing unit (CPU), or may be other general-purpose processor, a digital signal processor (DSP), an application specific integrated circuit (ASIC), or the like. The general-purpose processor may be a microprocessor or the processor may be any conventional processor or the like. The steps of the method disclosed in conjunction with the embodiments of the present application may be embodied as being directly implemented by a hardware processor, or by a combination of hardware and software modules in the processor.

It will be appreciated by those of ordinary skill in the art that all or part of the steps to implement the above-described method embodiments may be accomplished by hardware related to program instructions. The aforementioned program may be stored in a computer readable storage medium. When the program is executed, the steps including those in the above-described method embodiments are performed. The foregoing storage medium includes a read-only memory (ROM), a RAM, a flash memory, a hard disk, a solid-state disk, a magnetic tape, a floppy disk, an optical disc, and any combination thereof.

Finally, it should be noted that the above embodiments are merely intended to illustrate the technical solutions of the present application, rather than limiting them. Although the present application has been described in detail with reference to the foregoing embodiments, those of ordinary skill in the art will understand that it is still possible to modify the technical solutions described in the foregoing embodiments or to equivalently replace some or all of the technical features thereof. These modifications or substitutions do not preclude the nature of the respective technical solutions from the scope of the technical solutions of the embodiments of the present application.

What is claimed is:

1. An obstacle classification method based on an unmanned vehicle, comprising:
   obtaining obstacle information of a plurality of obstacles detected by a detection device of the unmanned vehicle; and
   performing classification processing on the obstacle information of the plurality of obstacles using a compressed random forest model, to obtain a result of obstacle classification, wherein the compressed random forest model comprises at least two decision trees; a non-leaf node of each decision tree of the at least two decision trees stores only feature index information, classification threshold index information and node position index information, wherein the node position index information is left node position index information or right node position index information, the left node position index information is used to indicate positions of a left node and a right node under the non-leaf node, and the right node position index information is used to indicate the positions of the left node and the right node under the non-leaf node; a leaf node of each decision tree stores only class index information,
   wherein the performing classification processing on the obstacle information of the plurality of obstacles using a compressed random forest model, to obtain a result of obstacle classification comprises:
      distributing the obstacle information of the plurality of obstacles into the decision trees of the compressed random forest model;
      performing, in each decision tree of the compressed random forest model, classification processing on the obstacle information inputted into the each decision tree, to obtain obstacle class information outputted from the leaf node of each decision tree; and
      obtaining the result of the obstacle classification according to the obstacle class information outputted from the leaf node of each decision tree, wherein the performing, in each decision tree of the compressed random forest model, classification processing on the obstacle information inputted into the each decision tree, to obtain obstacle class information outputted from the leaf node of each decision tree comprises:
  performing, in each decision tree of the compressed random forest model, the classification processing on the obstacle information inputted into the each decision tree, and determining whether or not the non-leaf node of each decision tree has the left node or the right node;
  storing the feature index information, the classification threshold index information, and the right node position index information in the non-leaf node of each decision tree in response to the non-leaf node of the each decision tree having the right node but not having the left node;
  storing the feature index information, the classification threshold index information, and the left node position index information in the non-leaf node of each decision tree in response to the non-leaf node of the each decision tree having the left node but not having the right node;
  storing the feature index information and the classification threshold index information in the non-leaf node of each decision tree, and store the left node position index information or the right node position index information in the non-leaf node of each decision tree, in response to the non-leaf node of the each decision tree having both the left node and the right node; and
  obtaining, according to a process of the classification processing, the obstacle class information outputted from the leaf node of each decision tree.

2. The method according to claim 1, wherein after the performing classification processing on the obstacle information of the plurality of obstacles using a compressed random forest model, to obtain a result of obstacle classification, the method further comprises:
  storing information that is stored in the leaf node of each decision tree of the compressed random forest model into a parent node corresponding to the leaf node; and
  deleting the leaf node of each decision tree of the compressed random forest model.

3. The method according to claim 1, wherein the non-leaf node comprises a root node, a node having a child node and a parent node.

4. The method according to claim 1, wherein the left node position index information is information on a relative address of the left node of each node in the decision tree relative to the right node of the each node;
  the right node position index information is information on a relative address of the right node of each node in the decision tree relative to the left node of the each node.

5. The method according to claim 1, wherein a field of the feature index information occupies 2 bytes, a field of the class index information occupies 2 bytes, a field of the classification threshold index information occupies 4 bytes, a field of the left node position index information occupies 4 bytes, and a field of the right node position index information occupies 4 bytes.

6. The method according to claim 1, wherein the detection device is any one of the following:
  a laser radar sensor, ultrasonic radar, an image detector, and an infrared detection device.

7. The method according to claim 1, wherein the obstacle information comprises at least one of the following:
  a movement speed of an obstacle, a volume of the obstacle, heat of the obstacle, and a distance between the obstacle and the unmanned vehicle.

8. An obstacle classification apparatus based on an unmanned vehicle, comprising a transmitter, a receiver, a memory and a processor;
  the memory is configured to store computer instructions;
  the processor, when executing the computer instructions stored in the memory, is configured to:
  obtain obstacle information of a plurality of obstacles detected by a detection device of the unmanned vehicle; and
  perform classification processing on the obstacle information of the plurality of obstacles using a compressed random forest model, to obtain a result of obstacle classification, wherein the compressed random forest model comprises at least two decision trees; a non-leaf node of each decision tree of the at least two decision trees stores only feature index information, classification threshold index information and node position index information, wherein the node position index information is left node position index information or right node position index information, the left node position index information is used to indicate positions of a left node and a right node under the non-leaf node, and the right node position index information is used to indicate the positions of the left node and the right node under the non-leaf node; a leaf node of each decision tree stores only class index information;
  wherein the processor is further configured to:
  distribute the obstacle information of the plurality of obstacles into the decision trees of the compressed random forest model;
  perform, in each decision tree of the compressed random forest model, classification processing on the obstacle information inputted into the each decision tree, to obtain obstacle class information outputted from the leaf node of each decision tree; and
  obtain the result of the obstacle classification according to the obstacle class information outputted from the leaf node of each decision tree;
  wherein the processor is further configured to:
  perform, in each decision tree of the compressed random forest model, classification processing on the obstacle information inputted into the each decision tree, and determine whether or not the non-leaf node of each decision tree has the left node or the right node;
  store the feature index information, the classification threshold index information and the right node position index information in the non-leaf node of each decision tree if it is determined that the non-leaf node of the each decision tree has the right node but does not have the left node;
  store the feature index information, the classification threshold index information and the left node position index information in the non-leaf node of each decision tree if it is determined that the non-leaf node of the each decision tree has the left node but does not have the right node;
  store the feature index information and the classification threshold index information in the non-leaf node of each decision tree, and store the left node position index information or the right node position index information in the non-leaf node of each decision tree, if it is determined that the non-leaf node of the each decision tree has both the left node and the right node; and obtain, according to a process of the classification processing, the obstacle class information outputted from the leaf node of each decision tree.

9. The apparatus according to claim 8, wherein the processor is further configured to:

store information that is stored in the leaf node of each decision tree of the compressed random forest model into a parent node corresponding to the leaf node after performing the classification processing on the obstacle information of the plurality of obstacles using the compressed random forest model and obtaining the result of the obstacle classification; and delete the leaf node of each decision tree of the compressed random forest model.

10. The apparatus according to claim 8, wherein the non-leaf node comprises a root node, a node having a child node and a parent node.

11. The apparatus according to claim 8, wherein the left node position index information is information on a relative address of the left node of each node in the decision tree relative to the right node of the each node; the right node position index information is information on a relative address of the right node of each node in the decision tree relative to the left node of the each node.

12. The apparatus according to claim 8, wherein a field of the feature index information occupies 2 bytes, a field of the class index information occupies 2 bytes, a field of the classification threshold index information occupies 4 bytes, a field of the left node position index information occupies 4 bytes, and a field of the right node position index information occupies 4 bytes.

13. The apparatus according to claim 8, wherein the detection device is any one of the following:

a laser radar sensor, ultrasonic radar, an image detector, and an infrared detection device.

14. The apparatus according to claim 8, wherein the obstacle information comprises at least one of the following:

a movement speed of an obstacle, a volume of the obstacle, heat of the obstacle, and a distance between the obstacle and the unmanned vehicle.

15. A non-transitory computer-readable storage medium, comprising a readable storage medium and computer instructions stored in the readable storage medium; the computer instructions are used to implement the obstacle classification method based on the unmanned vehicle according to claim 1.

* * * * *